(12) United States Patent
Hsiao

(10) Patent No.: US 6,976,624 B2
(45) Date of Patent: Dec. 20, 2005

(54) 7-IN-1 CARD READER FOR PCMCIA INTERFACE

(75) Inventor: Wen-Hsiang Hsiao, Taipei (TW)

(73) Assignee: WEM Technology Inc., Taipei (TW)

( * ) Notice: Subject to any disclaimer, the term of this patent is extended or adjusted under 35 U.S.C. 154(b) by 123 days.

(21) Appl. No.: 10/656,276

(22) Filed: Sep. 8, 2003

(65) Prior Publication Data

US 2005/0051626 A1    Mar. 10, 2005

(51) Int. Cl.$^7$ .............................................. G06K 7/06
(52) U.S. Cl. .................... 235/451; 235/440; 361/737; 439/638
(58) Field of Search ................. 235/451, 441, 235/440, 492, 486; 361/737, 764; 439/630, 439/631, 64, 638; 710/62, 301

(56) References Cited

U.S. PATENT DOCUMENTS

| | | | | |
|---|---|---|---|---|
| 6,015,092 A | * | 1/2000 | Postlewaite et al. | ........ 235/486 |
| 6,097,605 A | * | 8/2000 | Klatt et al. | .................. 361/737 |
| 6,402,558 B1 | * | 6/2002 | Hung-Ju et al. | ............ 439/638 |
| 6,438,638 B1 | * | 8/2002 | Jones et al. | .................. 710/301 |
| 6,540,523 B1 | * | 4/2003 | Kung et al. | .................... 439/64 |
| 6,612,492 B1 | * | 9/2003 | Yen | ............................. 235/492 |
| 6,672,904 B1 | * | 1/2004 | Chen | .......................... 439/631 |
| 6,700,788 B2 | * | 3/2004 | Matsushita et al. | ......... 361/737 |
| 6,738,259 B2 | * | 5/2004 | Le et al. | ...................... 361/737 |
| 6,751,694 B2 | * | 6/2004 | Liu et al. | .................... 710/301 |
| 6,776,348 B2 | * | 8/2004 | Liu et al. | .................... 235/492 |
| 6,786,415 B2 | * | 9/2004 | Yiu | ............................. 235/486 |
| 2001/0039129 A1 | * | 11/2001 | Nishimura | .................. 439/630 |
| 2002/0065001 A1 | * | 5/2002 | Sun | ............................. 439/630 |
| 2002/0178307 A1 | * | 11/2002 | Pua et al. | ...................... 710/62 |
| 2003/0098346 A1 | * | 5/2003 | Chen et al. | ................. 235/441 |
| 2004/0184246 A1 | * | 9/2004 | Le et al. | ...................... 361/764 |

FOREIGN PATENT DOCUMENTS

DE          296 07 724 U1  *  6/2002
EP          1 291 804 A1   *  3/2003

* cited by examiner

Primary Examiner—Jared J. Fureman
(74) Attorney, Agent, or Firm—Bacon & Thomas PLLC

(57) ABSTRACT

The 7-in-1 card reader has an electric connecting circuit in its cartridge coincident with an insertion slot of a PCMCIA interface; the cartridge is provided on the front side thereof with a first connecter for connecting an electric device having the PCMCIA interface, and on the rear end thereof with a first connecter module and a second connecter module for insertion of memory cards taken among those of seven specifications or those of CE, MD, MMC, MS, SD, SM and XD memory cards, and for proceeding to data reading, exchanging and transferring with the memory card through the electric connecting circuit, so that the electric device with the PCMCIA interface can read and write on the memory cards of the seven specifications.

6 Claims, 3 Drawing Sheets

7-IN-1 CARD READER FOR PCMCIA INTERFACE

BACKGROUND OF THE INVENTION

1. Field of the Invention

The present invention is related to a 7-in-1 card reader for a PCMCIA interface, and especially to a PCMCIA-interface card-reader for connection an electric device (such as a notebook) provided with a PCMCIA interface and for proceeding to data reading, exchanging and transferring with memory cards of seven specifications or those of CF, MD, MMC, MS, SD, SM and XD memory cards.

2. Description of the Prior Art

Generally, an electric device such as a digital camera, a digital video camera and a PDA etc. mostly is built therein with an insertion slot of a specific specification for a memory card to allow drawing it out of and changing it for a flash memory card to increase its capability of storage of data; thereby, there have been memory cards of various specifications including CompactFlash (CF) cards, Micro Drive (MD) cards, MultiMedia (MMC) cards, Memory Stick (MS) cards, Secure Digital (SD) cards. Smart Media (SM) cards and eXtreme Digital (XD) cards etc., and thereby when an electric device is to perform data reading, they similarly require a built-in insertion slot for a memory card of a corresponding specification to make connection of the memory cards with the electric device, and data reading, exchanging and transferring can then be done.

And more, common electric devices carried on ones' person such as a notebook not only are continuously elevated in their functions, but also are designed aiming at the direction of lightening weight in order to meet the feature of being convenient for carrying and receiving. Taking a notebook as an example, the electric device itself, in addition to the necessary input/output ports provided on a peripheral device, basically is equipped at least with a set of PCMCIA interface to render the peripheral device coincident with the PCMCIA interface to make connection with the notebook through an insertion slot for a PCMCIA interface on the notebook.

Hence there have been card readers meeting PCMCIA interfaces in the markets provided to make connection of electric devices with memory cards; however, card readers meeting PCMCIA interfaces available presently mostly can only afford use of inserted memory cards with specific specifications, thereby, when an electric device provided with a PCMCIA interface is used in connection with a memory card purchased from a market, limitation of quite a degree still exists because of the non-coincidence between the specification of the memory card and the specification of a card reader.

SUMMARY OF THE INVENTION

The 7-in-1 card reader for a PCMCIA interface of the present invention takes a cartridge coincident with the insertion slot of the PCMCIA interface as a main body; the cartridge is provided on the front side thereof with a first connecter for the PCMCIA interface, and on the rear end thereof with a first and a second connecter module, it is provided therein with an electric connecting circuit to make circuit connection of the first and the second connector modules with the first connecter.

Wherein the first connecter module has a plurality of insertion slots for memory cards of the specifications including those of CF, MD, MMC, MS and SD memory cards on a side thereof other than the side connecting with the connecting circuit; the second connecter module has an insertion slot for memory cards of the specifications including those of SM and XD memory cards on a side thereof other than the side connecting with the connecting circuit; thereby a card reader for connecting an electric device and for proceeding to data reading, exchanging and transferring with memory cards of seven specifications or those of CF, MD, MMC, MS, SD, SM and XD memory cards through a PCMCIA interface is obtained.

The present invention will be apparent in its structural combination and the entire mode of operation thereof after reading the detailed description of the preferred embodiment thereof in reference to the accompanying drawings.

DETAILED DESCRIPTION OF THE PREFERRED EMBODIMENT

Figure 1:
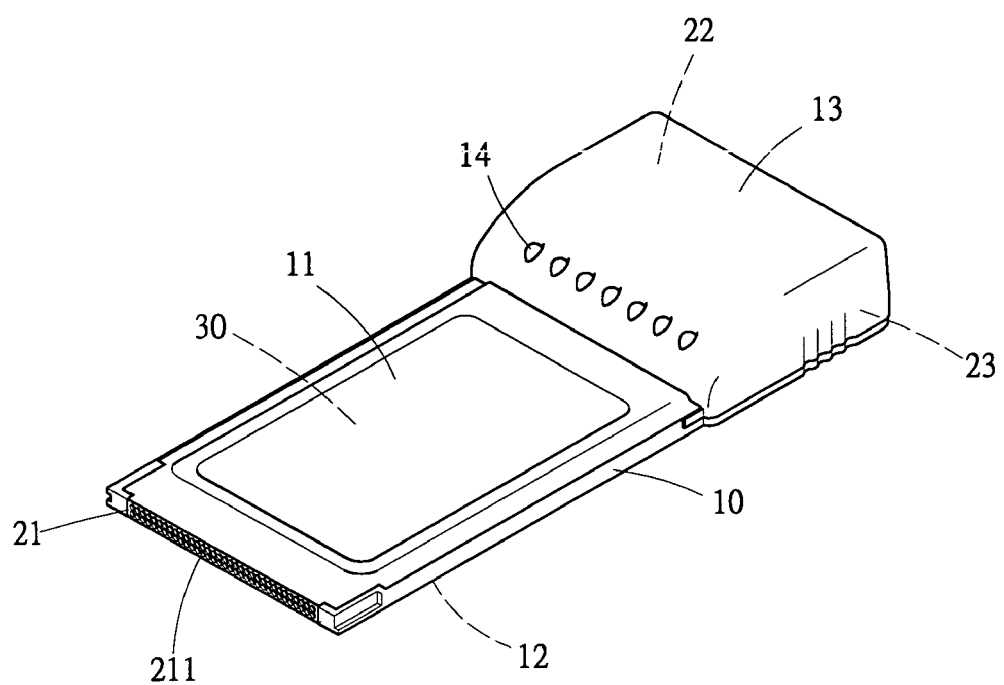
FIG. 1 is a perspective view showing the apparent structure of the card reader of the present invention.
Figure 2:
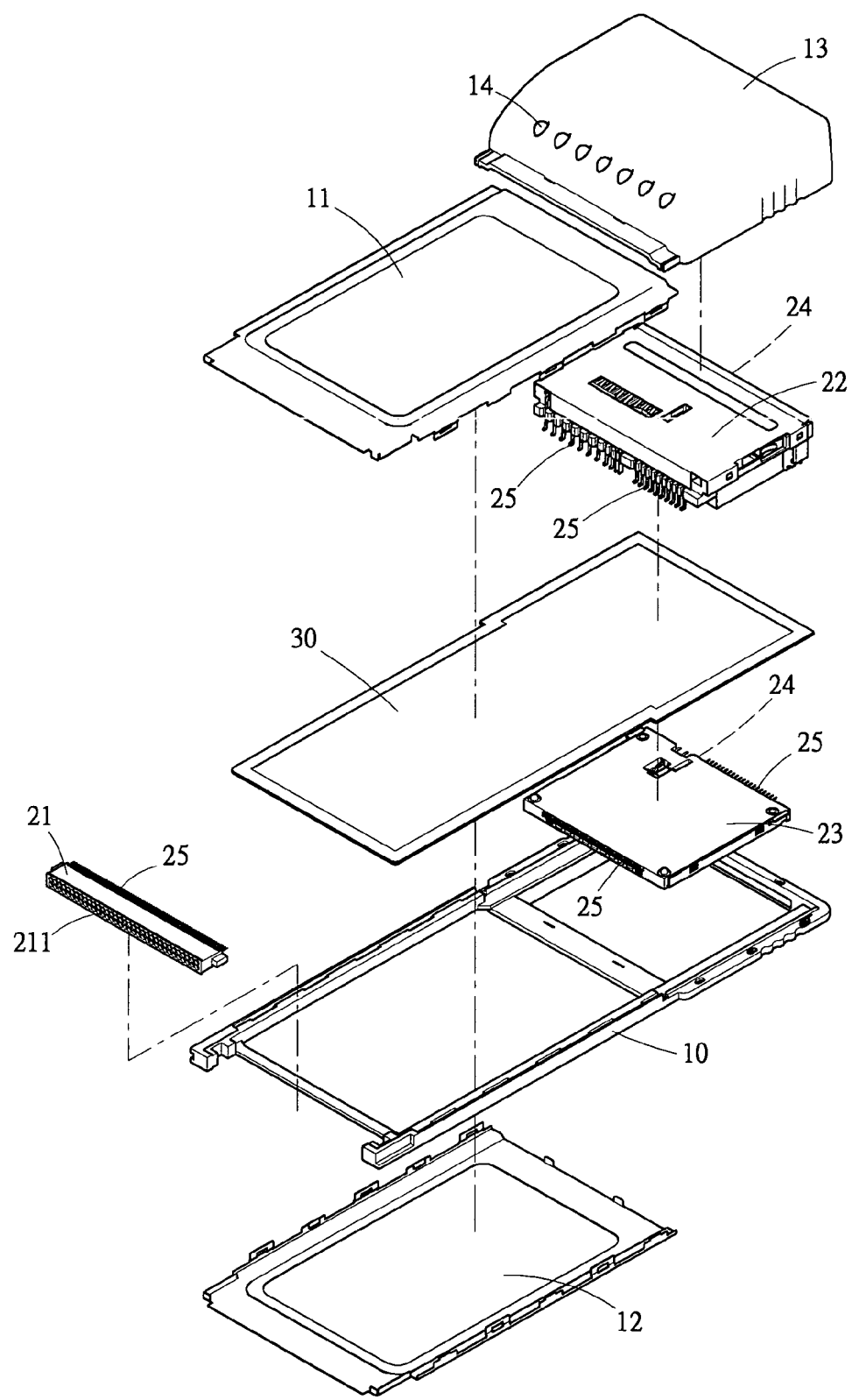
FIG. 2 is an analytic perspective view showing the structure of the card reader of the present invention.

The entire structure combination of the 7-in-1 card reader for a PCMCIA interface of the present invention is as shown in FIGS. 1 and 2, it takes a cartridge 10 coincident with the insertion slot of a PCMCIA interface as a main body; the cartridge 10 is provided on the front side thereof with a first connecter 21 for the PCMCIA interface, and on the rear end thereof with a first connecter module 22 and a second connecter module 23, it is provided therein with an electric connecting circuit 30 to make circuit connection of the second and the third connecters 22, 23 with the first connecter 21.

Wherein the first connecter 21 is fixed on the front side of the cartridge 10, and is connected with the connecting circuit 30 by means of connecting pins 25, a coupling part 211 provided on a side of the first connecter 21 other than the side connecting with the connecting circuit 30 forming inserting connection with the PCMCIA interface; the cartridge 10 has an upper cover 11 and a lower cover 12 to envelop a part of the main body of the connecting circuit 30 and a part of the main body of the first connecter 21 to expose the coupling part 211 of the first connecter 21 at the front side of the cartridge 10.

Figure 3:
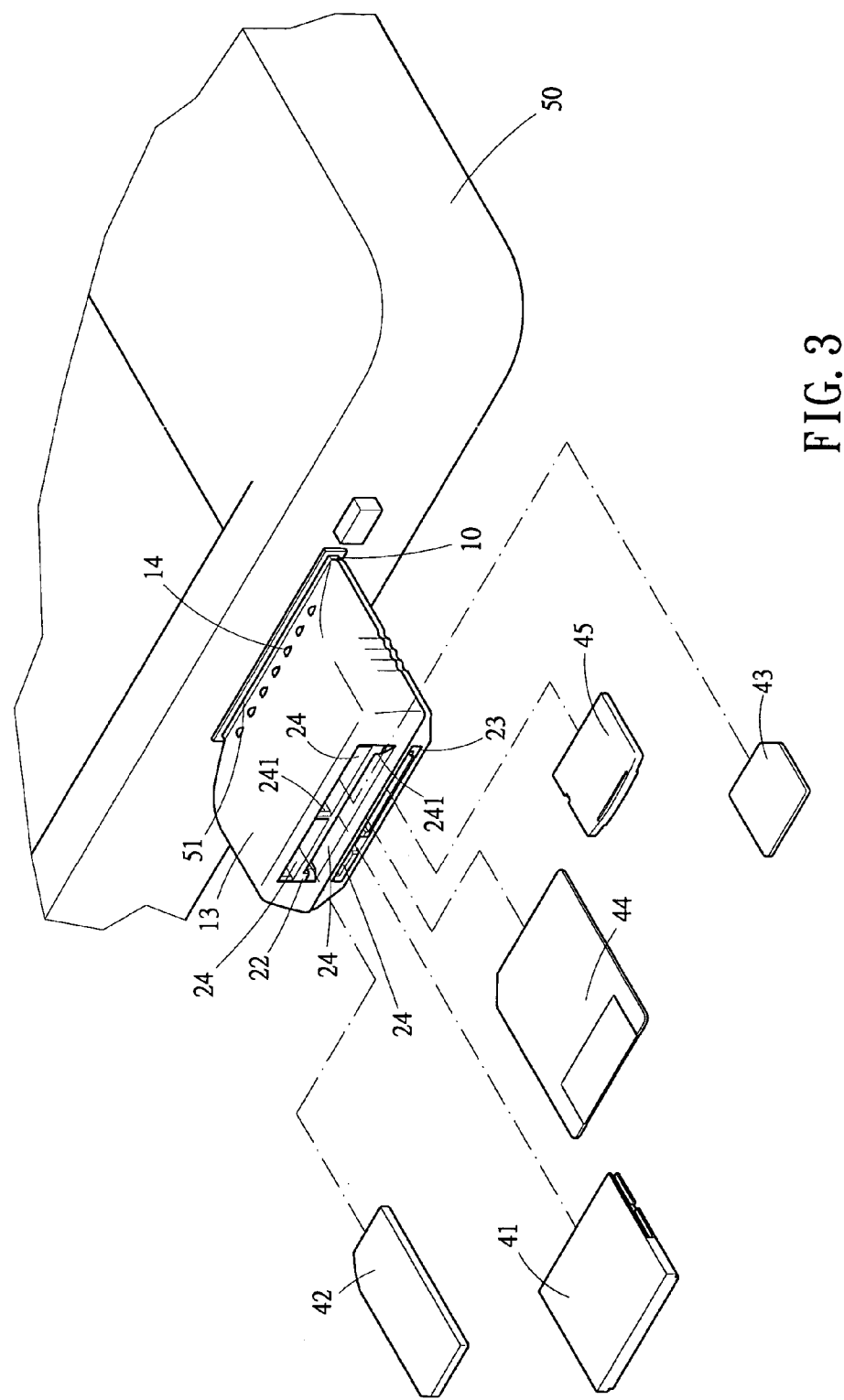
FIG. 3 is a perspective schematic view showing the states of inserting connection of the card reader of the present invention with an electric device such as a notebook and with memory cards.

Referring simultaneously to FIGS. 2 and 3, the first connecter module 22 has three insertion slots 24 for memory cards of the specifications including those of CF, MD, MMC, MS and SD memory cards on a side thereof other than the side connecting with the connecting circuit 30; the second connecter module 23 has an insertion slot 24 for memory cards of the specifications including those of SM and XD memory cards on a side thereof other than the side connecting with the connecting circuit 30; and the connecting pins 25 are provided at the insertion slots 24 on the second and the third connecters 22, 23 to connect with the connecting circuit 30.

In the embodiment shown in FIG. 3, one of the insertion slots 24 on the first connecter module 22 is common for an SD memory card 43 and an MMC memory card (not shown); the insertion slot 24 is provided on the inner side thereof with a channel 241 with a width and a thickness in coincidence with those of the MMC memory card and the SD memory card 43 to prevent wrong insertion of a memory card. Similarly, another one of the insertion slots 24 on the first connecter module 22 is common for a CF memory card 41 and an MD memory card (not shown); the insertion slot 24 is also provided on the inner side thereof with a channel 241 with a width and a thickness in coincidence with those of the CF memory card 41 and the MD memory card to prevent wrong insertion of a memory card.

Additionally, the cartridge 10 is provided on the rear part thereof with a cover 13 to envelop the main parts of the first and the second connector modules 22, 23. The cover 13 is further provided with indicating lights 14 connecting respectively to the insertion slots 24 of the first and the second connector modules 22, 23; the indicating lights 14 show the states of operation of the memory cards in the insertion slots 24.

When the entire card reader is in use, the cartridge 10 is inserted in a PCMCIA interface insertion slot 51 of an electric device 50 to connect with the electric device 50 via the PCMCIA interface of the first connecter 21, and allows inserting therein and connecting thereto memory cards taken among those of seven specifications or those of a CF memory card 41, an MD memory card (which commonly uses a memory card insertion-slot with the CF memory card, so that only the CF memory card is depicted to show the state of inserting and connecting), an MS memory card 42, an SD memory card 43, an MMC memory card (which commonly uses a memory card insertion-slot with the SD memory card, so that only the SD memory card is depicted to show the state of inserting and connecting), an SM memory card 44 and an XD memory card 45 via the second and the third connecters 22, 23, thereby it allows further data reading, exchanging and transferring with the electric device 50, this can largely increase the convenience of use and applicability in connecting and use of the electric device 50 having the PCMCIA interface with the memory cards sold in the markets.

Particularly, the first and the second connector modules of the entire card reader are provided respectively with insertion slots for memory cards connecting with the electronic circuit of the electric device via connecting pins, thereby the electric device has four kinds of swappable hardware for data storage by the fact that the first connecter module has three insertion slots for memory cards and the second connecter module has one insertion slot for memory cards, they can be regarded as four connectors capable of operating independently simultaneously; and by control of the IC in the electronic circuit on the circuit operation of the insertion slot for memory cards, the electric device can execute data exchanging, reading and writing simultaneously on the memory cards inserted in the insertion slots, or execute data exchanging and storing among the memory cards inserted in the insertion slots for the memory cards.

The description and drawings are only for illustrating a preferred embodiment of the present invention, and not for giving any limitation to the scope of the present invention. It will be apparent to those skilled in this art that various modifications or changes without departing from the spirit, scope and characteristic of this invention shall also fall within the scope of the appended claims of the present invention.

What is claimed is:

1. A 7-in-1 card reader for a PCMCIA interface, said card reader comprises:
   a cartridge having a shape in coincidence with an insertion slot of said PCMCIA interface, and being provided therein with an electric connecting circuit;
   a first connecter of a specification in coincidence with that of said PCMCIA interface, being fixed on a front side of said cartridge to connect with said electric connecting circuit;
   a first connecter module provided on a rear end of said cartridge to connect with said electric connecting circuit, and having a plurality of insertion slots for memory cards of specifications including those of CF, MD, MMC, MS and SD memory cards on a side thereof other than another side connecting with said electric connecting circuit, connecting pins are provided at said insertion slots to connect with said connecting circuit;
   a second connecter module provided on said rear end of said cartridge to connect with said electric connecting circuit, and having an insertion slot for memory cards of specifications including those of SM and XD memory cards on a side thereof other than said another side connecting with said electric connecting circuit;
   thereby a card reader is formed for connecting an electric device and for inserting therein and connecting thereto memory cards taken among those of seven specifications, that is to say, those of CF, MD, MMC, MS, SD, SM and XD memory cards through said PCMCIA interface as well as for proceeding to data reading, exchanging and transferring with said electric device.

2. The 7-in-1 card reader for a PCMCIA interface as in claim 1, wherein one of said insertion slots on said first connecter module is common for an MMC memory card and an SD memory card, said insertion slot is provided on an inner side thereof with a channel with a width and a thickness in coincidence with those of an MMC memory card and an SD memory card to prevent wrong insertion of a memory card.

3. The 7-in-1 card reader for a PCMCIA interface as in claim 1, wherein one of said insertion slots on said first connecter module is common for a CF memory card and an MD memory card, said insertion slot is provided on an inner side thereof with a channel with a width and a thickness in coincidence with those of an CF memory card and an MD memory card to prevent wrong insertion of a memory card.

4. The 7-in-1 card reader for a PCMCIA interface as in claim 1, wherein said first connecter is connected with said connecting circuit by using said connecting pins, a coupling part provided on a side of said first connecter other than said another side connecting with said connecting circuit forming inserting connection with said PCMCIA interface; said cartridge has an upper cover and a lower cover to envelop a part of a main body of said connecting circuit and a part a main body of said first connecter to expose said coupling part of said first connecter at said front side of said cartridge.

5. The 7-in-1 card reader for a PCMCIA interface as in claim 1, wherein said cartridge is provided on a rear part thereof with a cover to envelop main parts of said first and second connector modules.

6. The 7-in-1 card reader for a PCMCIA interface as in claim 1, wherein said cartridge is provided on a rear part thereof with a cover to envelop main parts of said first and second connector modules, said cover is further provided with indicating lights connecting respectively to said insertion slots of said second and third connecters; said indicating lights show states of operation of memory cards in said insertion slots.

* * * * *